No. 831,343. PATENTED SEPT. 18, 1906.
A. HERISSON.
FRICTION CLUTCH.
APPLICATION FILED MAY 29, 1905.

3 SHEETS—SHEET 2.

Witnesses:

Inventor
Albert Herisson
By James L. Norris.
Atty

No. 831,343. PATENTED SEPT. 18, 1906.
A. HERISSON.
FRICTION CLUTCH.
APPLICATION FILED MAY 29, 1905.
3 SHEETS—SHEET 3.
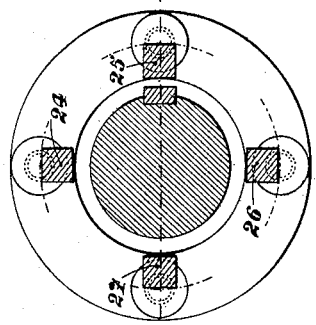
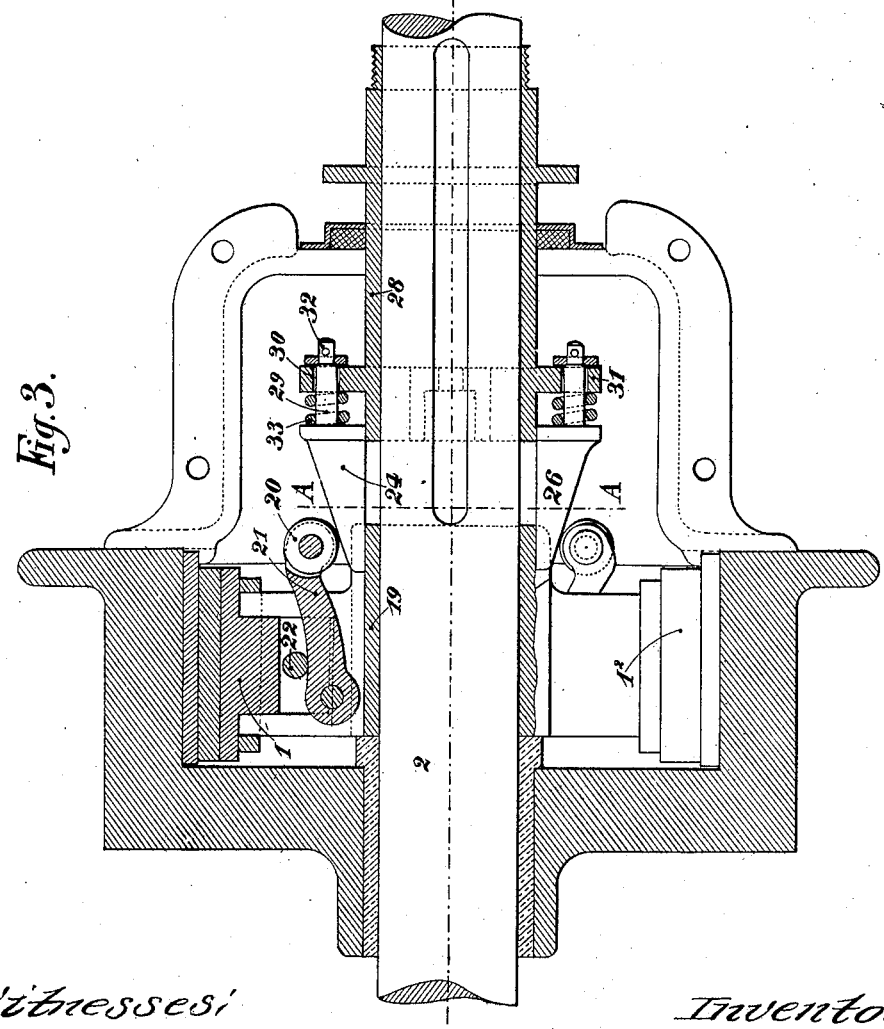
Witnesses:
Inventor
Albert Herisson

UNITED STATES PATENT OFFICE.

ALBERT HERISSON, OF NIMES, FRANCE.

FRICTION-CLUTCH.

No. 831,343.   Specification of Letters Patent.   Patented Sept. 18, 1906.

Application filed May 29, 1905. Serial No. 262,842.

*To all whom it may concern:*

Be it known that I, ALBERT HERISSON, engineer, a citizen of the French Republic, residing at Nimes, Department of Gard, France, have invented certain new and useful Improvements in Friction-Clutches, of which the following is a specification.

This invention has for its object to provide a friction-clutch the gradual action of which is insured in an absolute manner and adjusted in advance.

Figure 1:
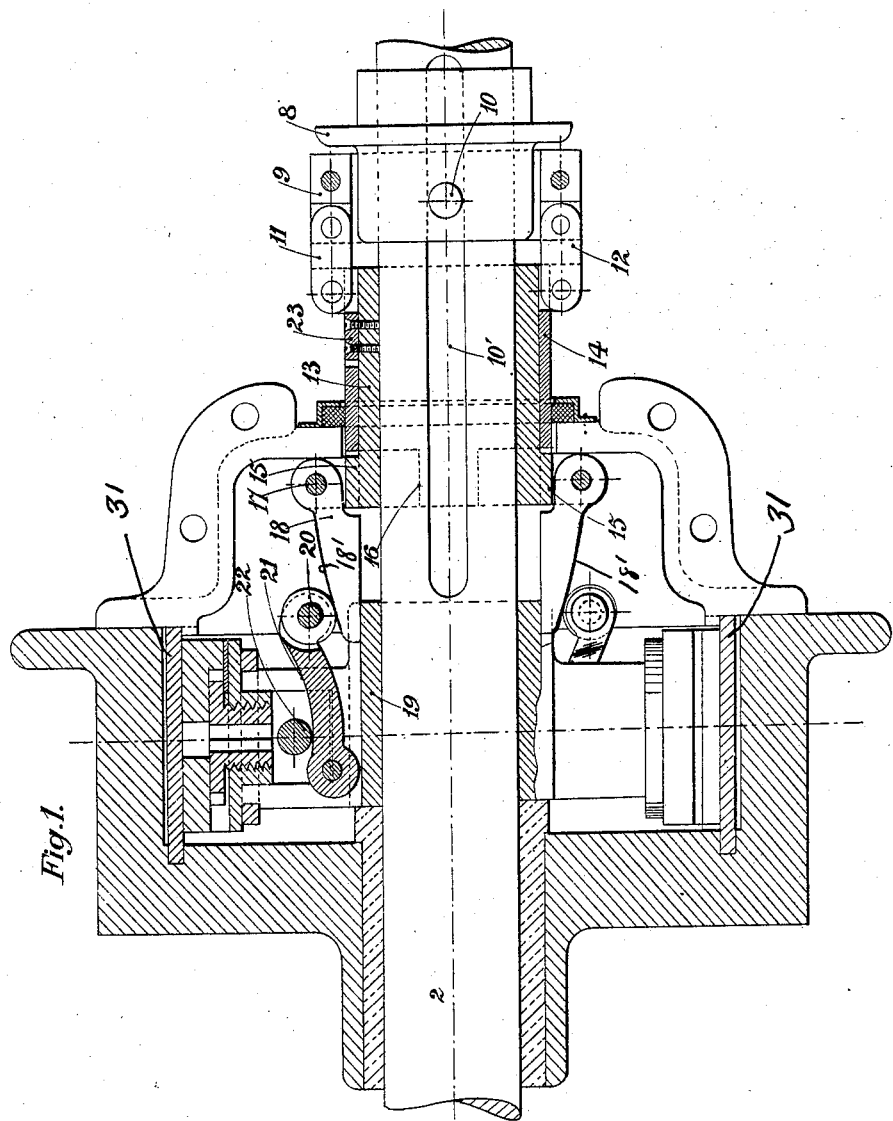
Figure 2:
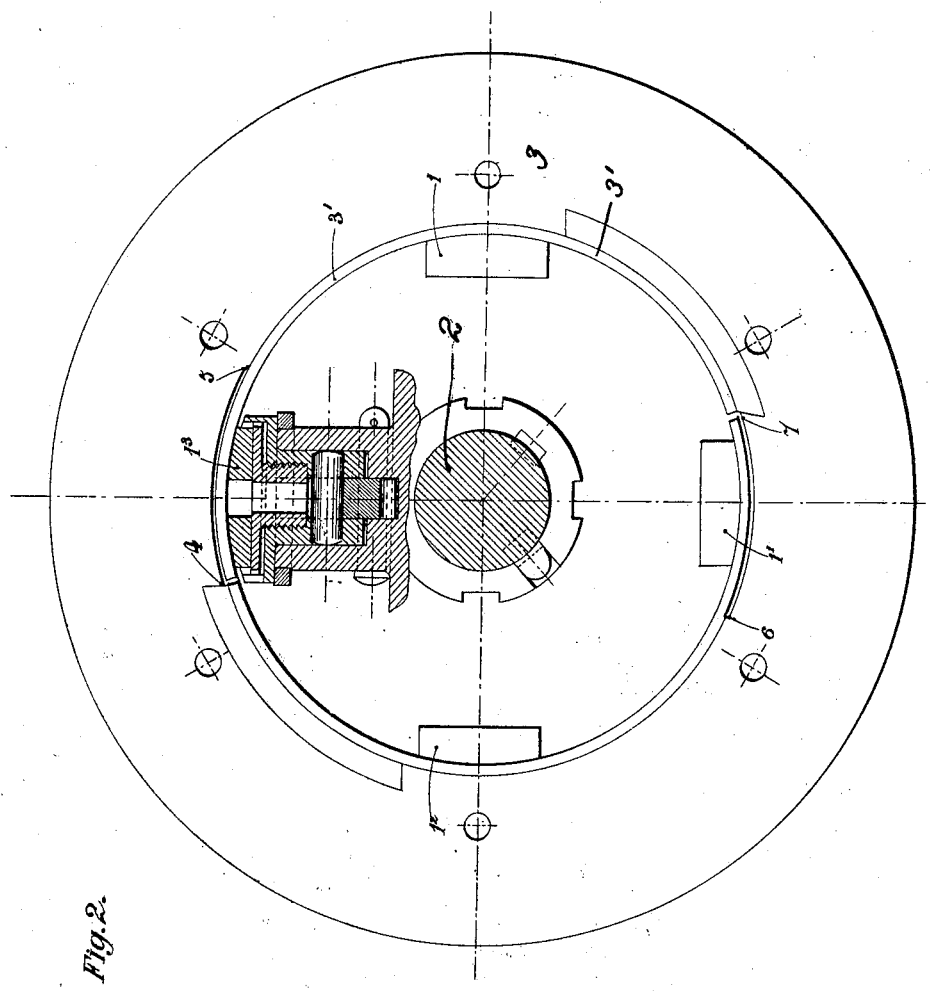

In the accompanying drawings, Figure 1 is a longitudinal section of the clutch. Fig. 2 is a simplified transverse section. Fig. 3 is a longitudinal section of a modification of the clutch, and Fig. 4 a transverse section through the line A A of Fig. 3.

The action of the clutch is obtained by means of four shoes 1 1' 1² 1³, mounted on the shaft 2, to be driven and capable of being moved radially away from the axis of this shaft, so as to press against an elastic wall 3' in a cup-shaped member 3, rotated by the motor. The elastic wall 3' in the cup-shaped member 3 is capable of assuming an oval shape on a part of its circumference, as at diametrically-opposed portions in the said wall of the said member 3 are depressions or offsets 4 5 and 6 and 7, and by pressure of the shoes on the elastic wall 3' at the depressions or offset portions 4 5 and 6 and 7 causes said wall 3' to take a substantially oval shape.

When the shoes 1' and 1³ are pressed against the elastic wall 3' at the locality of the offsets 4, 5, 6, and 7, the said elastic wall will be caused to engage in the latter, and the sliding pieces 1 and 1² are, on the contrary, against the rigid part of the cup-shaped member.

If the progress of the four shoes were simultaneous and exactly the same for each shoe, those shoes which are opposite the rigid parts (or parts of less diameter) of the cup-shaped members would as soon as they came into contact with the wall oppose the movement of the two other shoes. It is therefore necessary that the movements of the two pairs of shoes that are diametrically opposed to each other should be independent, although they may be controlled by the same working parts. When one of the pairs of shoes passes from the offsets of the cup-shaped member to the rigid part and the second pair enters the offsets, the shoes of this latter pair are able in their turn to advance, the others being pressed on the rigid wall. If the operating-gear is still acted upon, the same operations are repeated until the pressure exerted by the shoes is sufficient to insure the engagement of the clutch members.

The gradual movement of the shoes is obtained in the following manner: A sleeve 8, splined to the shaft 2, so as to be capable of rotating with it, may be shifted lengthwise on this shaft by means of an operating-fork actuated by a clutch-spring. This sleeve carries a collar 9, preferably made in two parts capable each of pivoting on a pin 10, the extension of which is guided in the slot 10'. This collar carries two links 11 and 12, arranged diametrically opposite each other, the link 11 being connected to a sleeve 13, capable of moving lengthwise on the shaft 2, while the link 12 is connected to a sleeve 14, capable of sliding on the said sleeve 13. The sleeve is provided at one end with two projections 15, arranged diametrically opposite each other. In a plane at right angles to the center line of the projection 15 the sleeve 14 is provided with two extensions 16. Both the projections 15 and extensions 16 carry pins 17, mounted in the lugs of wedges 18, the thin ends of which engage between a sleeve 19, mounted on the shaft 2, and rollers 20, carried by the ends of levers 21, pivoted to lugs provided on the sleeve 19. The levers 21 bear on pins 22 integral with the clutch-shoes.

To throw the clutch into gear, the sleeve 8 is by means of the operating-fork caused to move toward the cup-shaped member 3. When the clutch-shoes 1' 1³, corresponding to the wedges 18, fixed to the sleeve 13, are in the offsets of the cup-shaped member, the other shoes are in the rigid part of the latter. The wedges connected to the sleeve 13 can easily enter the space between the corresponding rollers 20 and the sleeve 19, while the wedges corresponding to the sleeve 14 have to overcome a certain resistance. The ring 9 oscillates round the pin 10, while the part pivotally connected to the sleeve 14 by the link 12 remains stationary, and the opposite part, connected to the sleeve 13, is moved to a certain extent until the stop 23, fixed to the sleeve 13, comes into contact with the sleeve 14.

The shoes 1' and 1³, which have moved a small amount forward, reach then the rigid part of the cup-shaped member, and the shoes 1 1² enter the offsets. The link 11 and the sleeve 13 remain stationary while the link 12 moves, and thereby pushes the sleeve 14 until the front part of the sleeve 14 comes into contact with the projection 15 of the sleeve 13. These alternate progressive movements of the shoes 1 1² and 1 1³ are repeated until friction is sufficient to insure the full engagement of the clutch members.

The progress of the shoes at each revolution of the cup-shaped member depends upon the amount of play left for the motion of the sleeve 14 between the projection 15 and the stop 23. The progressive action of the clutch is adjusted in advance by the amount of this play. If, for instance, the total play is one millimeter and the clutch is fully on after the sleeve 8 has moved fifteen millimeters, fifteen revolutions of the arrangement are required to bring the clutch members into full engagement. The inclined face of the wedges 18 is not flat. It is a curve such as at 18′, so that the force required to drive the wedges in does not increase with the pressure exerted by the shoes on the cup-shaped member and that the disengagement of the clutch readily takes place when the clutch is thrown out of gear.

In the modification shown in Figs. 3 and 4 the four wedges 24 25 26 27, corresponding, respectively, to the four shoes 1 1′ 1² 1³, are mounted on a sleeve 28, splined to the driven shaft 2, so as to be capable of rotating with it and to be shifted lengthwise on this shaft by means of an operating-fork actuated by a clutch-spring. The sleeve 19, carrying the shoes, is fixed on the shaft 2.

The wedges 24 25 26 27 are provided at their rear end with a tail 29, passing through holes 30, provided in an annular projection 31 of the sleeve 28. Keys 32 prevent the tails 29 from being disengaged from the holes 30. Springs 33 keep the wedges away from the projection 31 of the sleeve 28.

When the operating-fork is operated upon for coupling, as soon as the shoes are sufficiently moved two shoes come into contact with the rigid part of the cup-shaped member, preventing thus the forward motion of the corresponding wedges 24 and 26, for instance. As the sleeve 28 continues its forward motion the springs of these wedges 24 26 are compressed, the wedges remaining stationary. The two other shoes are during this time in the ovalized part of the cup-shaped member. Their corresponding wedges 25 27 and the sleeve 28 continue their forward movement, and the corresponding shoes are rotated till they come in the rigid part of the cup-shaped member. The wedges 25 26 can no more continue, then, their forward motion with the sleeve. Their springs will be compressed. At the same time the spring 3 of the wedges 24 26 expand, as their corresponding shoes are then in the offsets of the cup-shaped member, and these wedges are moved forward with the sleeve 28. The progress of the shoes continues thus at each revolution till the tightening is sufficient for insuring the driven shaft of being set in rotation by the motor.

Having now particularly described and ascertained the nature of my said invention and in what manner the same is to be performed, I declare that what I claim is—

1. A friction-clutch comprising a cup-shaped member having depressions in its inner wall, and oppositely-disposed to one another, an elastic ring mounted within the said cup-shaped member, movable shoes adapted for engagement with the said elastic ring and fixed to the shaft to be driven, pivotal arms operable on said shoes, and means slidable on the shaft to be driven for operating the arms to move the shoes in contact with the elastic ring.

2. In combination with a driving and driven shaft, a cup-shaped member secured to the driving-shaft and having an elastic wall, diametrically-movable shoes carried by the driven shaft, pivotal arms in engagement with the shoes, a sleeve mounted on the driven shaft and having a sliding movement longitudinally therewith, and wedges carried by said sleeve and adapted for engagement with the arms for operating the same to move the shoes in contact with the elastic wall of the cup-shaped member.

In testimony whereof I have hereunto set my hand in presence of two subscribing witnesses.

ALBERT HERISSON.

Witnesses:
EMILE KLOTZ,
PIERRE LEISV.